US009639807B2

(12) United States Patent
Berengueres et al.

(10) Patent No.: US 9,639,807 B2
(45) Date of Patent: May 2, 2017

(54) METHOD AND SYSTEM FOR FORECASTING FUTURE EVENTS

(71) Applicants: Jose Oriol Lopez Berengueres, Al Ain (AE); Zayed Mohammed AlMesabi, Al Ain (AE); Dmitry Efimov, Sharjah (AE); Mohammed Abdulla Humaid Al Shamisi, Al Ain (AE); Mohammed Gharib AlSaedi, Al Ain (AE); Ahmed Musallem AlMuharami, Al Ain (AE); Saeed Rashed AlShemaili, Al Ain (AE)

(72) Inventors: Jose Oriol Lopez Berengueres, Al Ain (AE); Zayed Mohammed AlMesabi, Al Ain (AE); Dmitry Efimov, Sharjah (AE); Mohammed Abdulla Humaid Al Shamisi, Al Ain (AE); Mohammed Gharib AlSaedi, Al Ain (AE); Ahmed Musallem AlMuharami, Al Ain (AE); Saeed Rashed AlShemaili, Al Ain (AE)

(*) Notice: Subject to any disclaimer, the term of this patent is extended or adjusted under 35 U.S.C. 154(b) by 309 days.

(21) Appl. No.: 14/301,038

(22) Filed: Jun. 10, 2014

(65) Prior Publication Data

US 2015/0356458 A1 Dec. 10, 2015

(51) Int. Cl.
*G06F 15/18* (2006.01)
*G06N 99/00* (2010.01)
(Continued)

(52) U.S. Cl.
CPC .......... *G06N 99/005* (2013.01); *G06N 7/005* (2013.01); *G06Q 10/04* (2013.01)

(58) Field of Classification Search
USPC ......................................................... 706/12
See application file for complete search history.

(56) References Cited

U.S. PATENT DOCUMENTS 7,472,099 B2 * 12/2008 Nishiuma .............. G06Q 10/04
706/14
8,620,852 B1 * 12/2013 Kipersztok .............. G06N 5/04
706/46

(Continued)

OTHER PUBLICATIONS

Automated conflict resolution for airport traffic using graduated intervention Timothy Waldron; Steven Stroiney; Rachel A Haga 2013 IEEE/AIAA 32nd Digital Avionics Systems Conference (DASC) Year: 2013 pp. 6B2-1-6B2-14, DOI: 10.1109/DASC.2013. 6712615 IEEE Conference Publications.*

(Continued)

*Primary Examiner* — Michael B Holmes
(74) *Attorney, Agent, or Firm* — Fitch, Even, Tabin & Flannery LLP

(57) ABSTRACT

Embodiments of the present invention provide a method comprising: providing training data for training at least one mathematical model, wherein the training data is based on past flight information of a plurality of passengers, and the training data comprises a first set of vectors and an associated target variable for each passenger in the plurality of passengers; training at least one mathematical model with the training data; and providing a second set of vectors relating to past flight information of the passenger as inputs to the trained at least one mathematical model and calculating an output of the trained at least one mathematical model based on the inputs, wherein the output represents a prediction of future flight activities of the passenger.

8 Claims, 4 Drawing Sheets

TIMELINE OF EVENTS OF A FIRST TIME PASSENGER

(51) Int. Cl.
    *G06N 7/00*        (2006.01)
    *G06Q 10/04*       (2012.01)

(56) References Cited

U.S. PATENT DOCUMENTS

| | | | |
|---|---|---|---|
| 8,811,670 B2* | 8/2014 | Mundhenk | G06T 7/2006 |
| | | | 382/103 |
| 2012/0191527 A1 | 7/2012 | Reichert et al. | |
| 2015/0105272 A1* | 4/2015 | Anastassiou | G06F 19/70 |
| | | | 506/2 |
| 2015/0356458 A1* | 12/2015 | Berengueres | G06N 99/005 |
| | | | 706/12 |

OTHER PUBLICATIONS

Intelligent Stock Selecting via Bayesian Naive Classifiers on the Hybrid Use of Scientific and Humane Attributes Tien-Tsai Huang; Chir-Ho Chang 2008 Eighth International Conference on Intelligent Systems Design and Applications Year: 2008, vol. 1 pp. 617-621, DOI: 10.1109/ISDA.2008.148 IEEE Conference Publications.*

Prediction of descent trajectories based on Aircraft Intent Eduardo Gallo 29th Digital Avionics Systems Conference Year: 2010 pp. 2.D.1-1-2.D.1-16, DOI: 10.1109/DASC.2010.5655487 IEEE Conference Publications.*

International Search Report and Written Opinion, International Patent Application No. PCT/IB2015/054349, dated Jul. 22, 2015, 8 pages.

* cited by examiner

USE OF EXTRAPOLATION FOR PREDICTING WHEN/OR IF A CUSTOMER WILL BECOME HIGH-VALUE CUSTOMER. Y-AXIS REPRESENTS ACCUMULATED MILES EARNED BY A GIVEN CUSTOMER. X-AXIS REPRESENTS TIME. DASHED-LINE INDICATES PREDICTION.

CORRELATION OF SILVER ATTAINMENT WITH EXTRAPOLATION
METHOD VS CORRELATION OF SILVER ATTAINMENT WITH D/S MODEL
FOR FIVE DIFFERENT D/S CASES AS DEFINED IN TABLE 2

| PASSENGER NAME | TIER STATUS | PROBABILITY THEY WILL BECOME SILVER IN X MONTHS | |
|---|---|---|---|
| WOLFGANG AMADEUS MOTZART | BASIC | ⇧ | 0.99 |
| LUDVIG VAN BEETOVEN | BASIC | ⇧ | 0.97 |
| GIUSEPPE VERDI | BASIC | ⇧ | 0.89 |
| JEAN-MICHEL JARRE | BASIC | ⇧ | 0.77 |
| YASUHARU KONISHI | BASIC | ⇧ | 0.77 |
| MAKI NOMIYA | BASIC | ⇨ | 0.45 |
| TERESA TENG | BASIC | ⇨ | 0.42 |
| CARL PHILIP EMANUEL BACH | BASIC | ⇨ | 0.41 |
| ENRIC GRANADOS | BASIC | ⇩ | 0.00 |
| LEONARD BERNSTEIN | BASIC | ⇩ | 0.00 |
| CARL LOEWE | BASIC | ⇩ | 0.00 |
| JOHAN STRAUSS | BASIC | ⇩ | 0.00 |
| ISAAC ALBENIZ | BASIC | ⇩ | 0.00 |
| GEORGE GERSCHWIN | BASIC | ⇩ | 0.00 |
| JOHN LENON | BASIC | ⇩ | 0.00 |
| JOHN WILLIAMS | BASIC | ⇩ | 0.00 |

EXAMPLE OF RANKING APPLICATION FOR REAL-TIME RESOURCE ALLOCATION OF BUSINESS SEAT UPGRADES

FIG 4

METHOD AND SYSTEM FOR FORECASTING FUTURE EVENTS

FIELD OF THE INVENTION

This invention generally relates to forecasting future events based on historical data, and in particular, to using data mining algorithms to forecast customer activities in an airline's miles loyalty program and to improve resource allocation of an airline's miles.

BACKGROUND

Airlines have miles loyalty programs, in which customers are classified into a number of tiers according to their usage of the Airlines, and are awarded if they are in a higher tier and are more frequent users of the program. For example, a miles program may use three main tiers: basic, silver and gold, to classify customers by value, ordered from less to more important users.

By using historical data of customers, it is possible to predict future events, such as whether in forthcoming month(s), a new passenger would become a privileged frequent flyer. This information can then be used in Custom Relationship Management (CRM) interactions between the airline and the passenger and resource allocation of the airline system.

Various methods have been proposed and used for optimizing operations in the airline industry. In 2003, a model that predicts no-show ratio with the purpose of optimizing overbooking practice claimed to increase revenues by 0.4% to 3.2%. More recently, in 2013, Alaska Airlines in cooperation with G.E and Kaggle Inc., launched a $250,000 prize competition with the aim of optimizing costs by modifying flight plans. However, there is very little work on miles programs or frequent flier programs that focus on enhancing their value. In 2001 work focused on segmenting users according to return flight and length of stays was carried out.

Current methods for predicting future tier status of a customer also include linear extrapolation. FIG. 1 shows how linear extrapolation is used to predict when or if a customer will become high-value customer. A passenger flight activity is observed on a monthly basis, then a linear extrapolation is made for projecting how much they will fly in the coming month(s).

SUMMARY OF THE INVENTION

According to a first aspect of the present invention, there is provided a method comprising: providing training data for training at least one mathematical model, wherein the training data is based on past flight information of a plurality of passengers, and the training data comprises a first set of vectors and an associated target variable for each passenger in the plurality of passengers; training at least one mathematical model with the training data; and providing a second set of vectors relating to past flight information of a passenger as inputs to the trained at least one mathematical model and calculating an output of the trained at least one mathematical model based on the inputs, wherein the output represents a prediction of future flight activities of the passenger.

According to one embodiment of the present invention, the at least one mathematical model comprises a first mathematical model and a secondary mathematical model, wherein said calculating an output of the trained at least one mathematical model comprises calculating an output of the trained first mathematical model based on the inputs, calculating an output of the trained secondary mathematical model based on the inputs and calculating a final output based on the outputs of the first and the second mathematical models.

According to a further embodiment of the present invention, the first mathematical model is a Generalized Boosted Regression Model (GBM).

According to a further embodiment of the present invention, the second mathematical model is generalized liner model (GLM).

According to a further embodiment of the present invention, calculating the final output based on the outputs of the first and the second mathematical models comprises calculating the final output as a linear combination of the outputs of the first and the second mathematical models.

According to a further embodiment of the present invention, the linear combination is substantially 80% of the output of the first mathematical model and substantially 20% of the output of the second mathematical model.

According to a further embodiment of the present invention, the mathematical model is a boosting algorithm.

According to a further embodiment of the present invention, the mathematical model is a machine learning meta-algorithm.

According to a further embodiment of the present invention, the first mathematical model implements extensions to Adaptive Boost algorithm and Gradient Boosting algorithm.

According to a further embodiment of the present invention, the training data comprises cluster features for associating the passengers with their respective clusters, wherein said cluster features are obtained by k-means algorithms for classifying the plurality of passengers into a plurality of clusters.

According to a further embodiment of the present invention, the output representing a prediction of future flight activities of the passenger is used for determining resource allocation to the passenger.

According to a second aspect of the present invention, there is provided a system comprising at least one processor and at least one memory configured to provide training data for training at least one mathematical model, wherein the training data is based on past flight information of a plurality of passengers, and the training data comprises a first set of vectors and an associated target variable for each passenger in the plurality of passengers; to train at least one mathematical model with the training data; and to provide a second set of vectors relating to past flight information of the passenger as inputs to the trained at least one mathematical model and to calculate an output of the trained at least one mathematical model based on the inputs, wherein the output represents a prediction of future flight activities of the passenger.

According to a further embodiment of the present invention, the at least one mathematical model comprises a first mathematical model and a secondary mathematical model, wherein the system is configured to calculate an output of the trained first mathematical model based on the inputs, calculating an output of the trained secondary mathematical model based on the inputs and calculating a final output based on the outputs of the first and the second mathematical models.

According to a further embodiment of the present invention, the first mathematical model is a Generalized Boosted Regression Model (GBM).

According to a further embodiment of the present invention, wherein the second mathematical model is generalized liner model (GLM).

According to a further embodiment of the present invention, the system is configured to calculate the final output as a linear combination of the outputs of the first and the second mathematical models.

According to a further embodiment of the present invention, the mathematical model is a Boosting algorithm.

According to a further embodiment of the present invention, the first mathematical model implements extensions to Adaptive Boost algorithm and Gradient Boosting algorithm.

According to a further embodiment of the present invention, the training data comprises cluster features for associating the passengers with their respective clusters, wherein said cluster features are obtained by k-means algorithms for classifying the plurality of passengers into a plurality of clusters.

According to a third aspect of the present invention, there is provided a computer software program, when run on a computer, causing the computer to perform the method according to one of the above aspect or embodiments of the present invention.

BRIEF DESCRIPTION OF THE DRAWINGS

Embodiments of the invention shall now be described, by way of example only, with reference to the accompanying drawings in which:

FIG. 4 shows an example of a ranking result for real-time resource allocation of business seat upgrades.

DETAILED DESCRIPTION

Embodiments of the present invention relate to a method that ranks customers according to their probability to become part of a privileged miles-tier in an airline's miles loyalty program. The application can be used to perform real time allocation of limited resources such as available upgrades on a given flight to the customers who are more likely to be within a privileged miles-tier in future. The airline can assign the resources to the passengers with the highest revenue potential thus increasing the perceived value of the program at no extra cost.

Embodiments of the present invention aim at predicting and discriminating which of the new passengers who enroll the miles program will become high-value customers before it is obvious to a human expert, so that potential high-value customers are identified in order to gain their loyalty sooner, and that limited resources such as upgrades are optimally allocated to passengers with potential to become high-value.

Embodiments of the present invention use data mining techniques. A mathematical model is trained using a training set comprising data relating to passengers' past behaviours. A trained mathematical model is then used to forecast a future tier of a passenger in real time based on the passenger's past activities.

In one embodiment of this invention, two mathematical models are trained: GBM (Gradient Boosting Machine) and GLM (Generalized Linear Model), and their results are combined (linear combination, for example prediction=80% of GBM+15% of GLM prediction) to provide an optimal predictive outcome.

Figure 2:
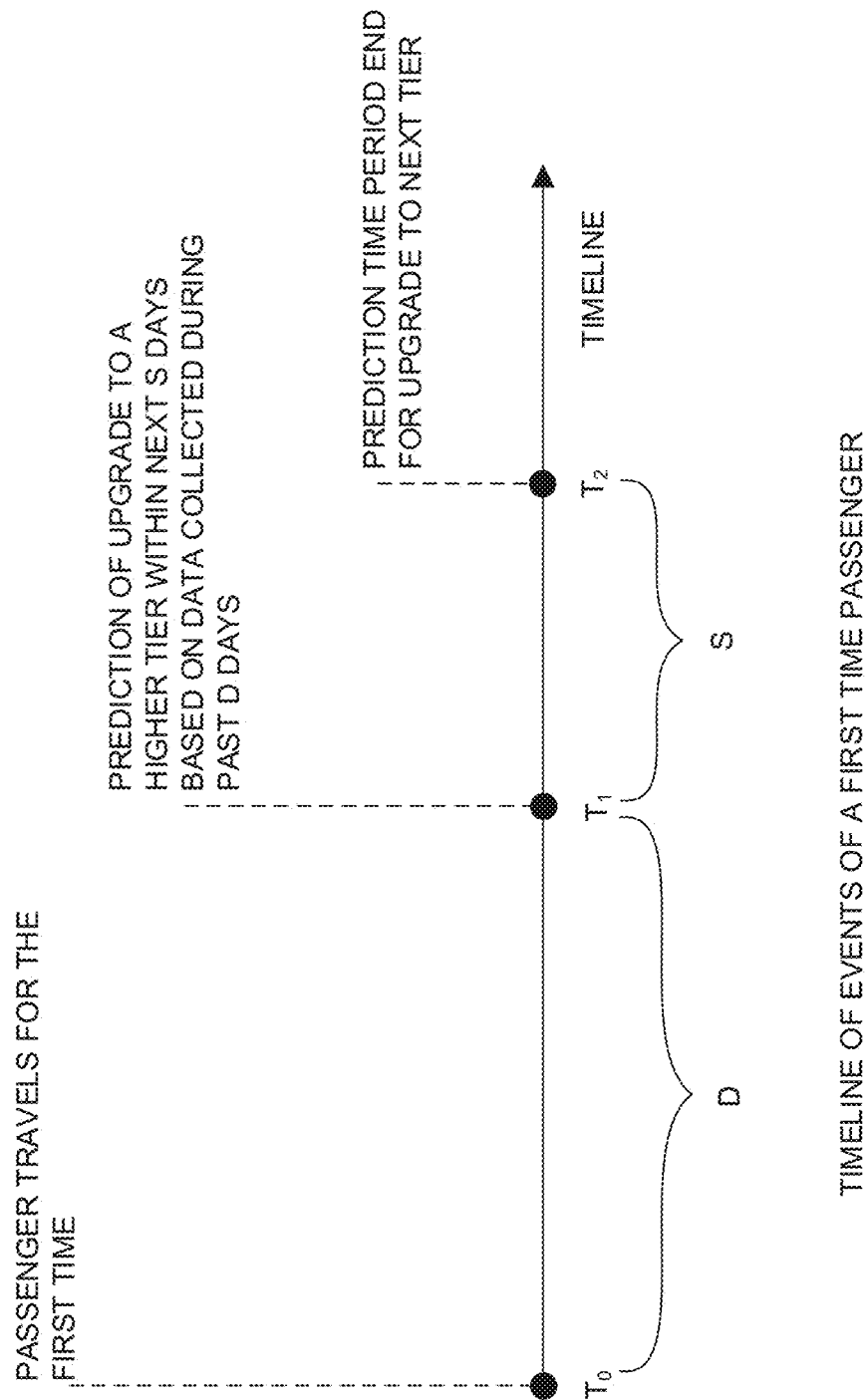
FIG. 2 shows a timeline of events of a first time passenger.
Figure 3:
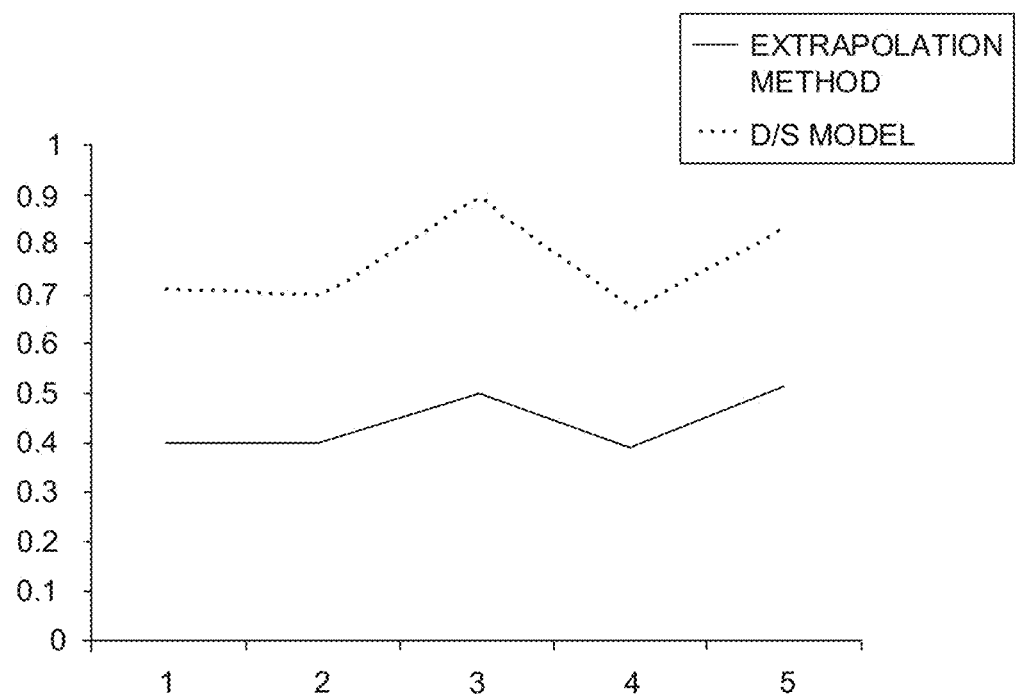
FIG. 3 illustrates correlation of silver attainment with Extrapolation Method vs. correlation of silver attainment with D/S model for five different D/S cases as defined in Table 2.

In one embodiment of the present invention, the possibility of a customer changing from basic to silver and/or gold is investigated. After a user took his/her first flight with the airline, their activity is observed for D days (FIG. 2). At the same time each user is assigned with a value of 1 or 0 depending on whether they will attain Silver or greater tier status within S additional days after day D. In the context of this embodiment, this model referred to as a D/S model and this binary variable is referred to as silver_attain. When a new customer joins the program, (and D days have passed since then) the model can be used to assess the likelihood that he/she will become a Silver member in the near or far future. FIG. 2 and Table I show some examples. In this embodiment, the silver tier status is granted to high-value customers.

Training Data

Raw training data for training one or more mathematical models can be obtained from historical data provided by airlines. In this embodiment, raw data of a miles program is real data provided by an airline. Table I illustrates a structure of the raw data and contains typical air miles program data such as: (1) age and demographics of passengers, (2) information on loyalty program purchases etc, (3) Flight activity, miles earned etc.

TABLE I

Exemplary format of raw data

| Dataset | Fields |
|---|---|
| Passengers | Id, Date_of_birth, Nationality, City, State, Country, Interest_1, Interest_2, Interest_3, Interest_4, Interest_5, Tier |
| Flights | Id, Company, Activity_date, Origin, Destination, Class_code, Flt_number, Definition, Miles, Points, |
| Activity (not used) | Id, Definition, Issue_date, Miles, Redeposited_points, Flight_date, Class_code, Origin, Destination, Flight_number, Ret_flight_date, Ret_flight_number, Ret_class_code, Ret_origin, Ret_destination, Product_code, Cash_before_premium |

The raw data contains most comprehensive information about each passenger and some of the information may be omitted in training the mathematical models.

In this embodiment, actual training data is obtained from the raw data after the following steps: 1) cleaning of the raw training data; and 2) feature extraction from the cleaned training data.

Cleaning

Cleaning is a step for removing data irrelevant to training the mathematical model from the raw data. For example, in table 1, there are three sets of data: Passengers, Flights and Activity. Activity is filtered out and not included in the training data. In addition, passengers with low activity (number of flights less than 2) and passengers with very high activity (number of flights greater than 500) may also be excluded from the training data. Additionally, passengers' names can also be removed or replaced by codes, such as alphanumeric hash codes of length 32 characters long or integer numerical values.

Feature Extraction

Feature extraction is a step of extracting or deriving information from cleaned raw data to form a vector for each passenger. For each passenger a vector being built up relates to data pertaining to the D period only. For example, if D=15 days, then the data used for training the one or more mathematical models relate to any flights between start_date and start_date+D, where start_date is the first flight date of new passengers. Start_date may vary for each passenger. Then, for each passenger a vector is built up, containing data and information relating to the passenger, which include at least the following:

1) the passenger,
2) start_date, and
3) length of D.

This vector contains a plurality components and it is equivalent to a digital fingerprint of the passenger for the period D. In the context of the embodiments of this invention, each component of the vector is called a "feature". Some features are straightforward to calculate and others require complex calculations. The following sections explain the calculation of some features. The features are divided into three groups: metric, categorical and cluster features.

Group 1—Metric Features

A metric feature is data that is already in numerical format. These features may include those in table II:

TABLE II

Metric features

| Feature Label | Example |
|---|---|
| Age_of_passenger | 43 (years) |
| Sum of miles | 25500 (miles) |
| Average miles | 13540.50 |
| Interest_1 | 0 or 1 (1 = customer marked as interested for Interest_1 in the website when he registers) |
| Interest_2 | 0 or 1 |
| Interest_3 | 0 or 1 |
| Interest_4 | 0 or 1 |
| Interest_5 | 0 or 1 |

Group 2—Categorical Features

A categorical feature is a text variable, the content of which can only belong to a finite group of choices. City name is an example of a categorical feature. Categorical variables must be converted to numbers before being used in training mathematical models. One way to convert these variables to numbers is to use the Dummy Variable Method, i.e. to encode each categorical variable using a binary value. A dummy variable (also known as a Boolean indicator or binary variable) is one that takes the value 0 or 1 to indicate the absence or presence of some categorical effect that may be expected to shift the outcome.

One example of the dummy variable is cities to where the passenger has flown during D. Each city to which the airline flies is a represented as a feature in the vector. If the given passenger did fly to the given city during period D once or multiple times, then the variable for this feature is set to 1, otherwise it is set to 0. The categorical variables that adopt the binary format using the dummy method may include:

1) Passenger Nationality
2) City of Passenger's address
3) State of Passenger's address
4) Country of Passenger's address
5) Passenger's Company (Employer),
6) Flight Origin (Airport)
7) Flight Destination (Airport)
8) Ticket Class Code (Economy E, F, K . . . )

The order of these features is preferably kept the same for all passengers. However, the chosen order may be arbitrary and does not affect performance. Table III shows an example of how city was converted from categorical to binary.

TABLE III

Example of conversion form categorical to binary

| Feature Label | Example Value |
|---|---|
| City_1 (Amsterdam) | 0 |
| City_2 (Barcelona) | 1 |
| . . . | . . . |
| City_323 (Zagreb) | 1 |
| Class_code_1 ("A") | 0 |
| Class_code_2 ("B") | 1 |
| Class_code_3 | 1 |
| . . . | . . . |
| Class_code_45 ("Z") | 0 |

Group 3. Cluster Features

Clustering can help to divide passengers in groups before the training of the main model. The purpose of this procedure is to apply different parameters of the mathematical model to different groups of passengers.

Once all categorical features are converted to numerical ones, it is possible to apply clustering algorithms to identify groups of passengers with similar associated vectors. In this embodiment, k-means algorithms with different number of clusters (2, 3, 5, 7, 10, 15, 20) are used to classify all passengers in clusters. K-means clustering is a method of vector quantization that is popular for cluster analysis in data mining. K-means clustering aims to partition n observations into k clusters in which each observation belongs to the cluster with the nearest mean, serving as a prototype of the cluster. k denotes the number of clusters. For example if k is set to be 3, it means that there are 3 clusters (A, B, C) into which the passengers may be classified.

Each passenger vector is assigned to the "closest" cluster center as defined by Euclidean distance in n-dimensions, where n is the number of features of the vectors. At this point a cluster label ("A", "B", "C") is assigned to each passenger vector. Then the Dummy Variable Method is used to label the cluster to which each passenger vector belongs using binary features.

For each passenger all previous features (of table II and III) are put in a vector form. Then each vector is input into a k-means algorithm for k=3. If there are 100 passengers and 100 associated vectors, the algorithm will attempt to classify each of the 100 vectors into k=3 clusters, A or B or C. Using the dummy variable method three new variables Cluster_k3_A, Cluster_k3_B, Cluster_k3_C, are generated. Then if a vector (passenger) belongs to "A", its Cluster_k3_A feature is set to 1, and Cluster_k3_B and Cluster_k3_C are set to 0. Similarly, if the vector belongs to "B" then only Cluster_k3_B is set to 1, and so on. In this embodiment, this process is repeated for k=2, 5, 7, 10, 15, 20. Table IV shows an example where a passenger vector has been classified into cluster "B" for k=2, cluster "A" for k=3, etc.

TABLE IV

Example of Creation of 60 Cluster features by the Dummy Variable Method

| k | Example of K-means output (categorical) | Label of the new binary Features | Binary Value |
|---|---|---|---|
| 2 | "B" | Cluster_k2_A | 0 |
|   |     | Cluster_k2_B | 1 |
| 3 | "A" | Cluster_k3_A | 1 |
|   |     | Cluster_k3_B | 0 |
|   |     | Cluster_k3_C | 0 |
| 5 | "C" | Cluster_k5_A | 0 |
|   |     | Cluster_k5_B | 0 |
|   |     | Cluster_k5_C | 1 |
|   |     | Cluster_k5_D | 0 |
|   |     | Cluster_k5_E | 0 |
| 7 | "C" | Cluster_k7_A | 0 |
|   |     | Cluster_k7_B | 0 |
|   |     | Cluster_k7_C | 1 |
|   |     | Cluster_k7_D | 0 |
|   |     | Cluster_k7_E | 0 |
|   |     | Cluster_k7_F | 0 |
|   |     | Cluster_k7_G | 0 |
| 10 | "A" | Cluster_k10_A | 1 |
|    |     | ... | ... |
|    |     | Cluster_k10_K | 0 |
| 20 | "A" | Cluster_k20_A | 1 |
|    |     | ... | ... |
|    |     | Cluster_k20_T | 0 |

Forming Vectors Based on the Features

After all this process, these binary cluster features are added to their corresponding passenger vector. Table V shows examples of vectors for the passengers. The order of the features is not important, although maintaining a consistent ordering of features for all passengers is important. The more training vectors are available, the more accurate the predictions are likely to be. In this embodiment, 50,000 vectors, each corresponding to its respective passenger, are used to train the model.

TABLE V

Example of feature vectors generated per each passenger

| Passenger Id | Example vector |
|---|---|
| 1 | (43, 13.54, . . . , 0, 0, 12, 0, . . . , 0, 1, 1, 0, 0, 0, . . . , 0, 0, 0) |
| 2 | (26, 2.9, . . . , 0, 0, 12, 0, . . . , 0, 1, 1, 0, 0, 0, . . . , 0, 0, 0) |
| ... | ... |

Target Variable

A target variable corresponding to each vector and each passenger is also defined. In this example, this target variable indicates the result that the passenger has or has not become a silver tier during the S period. The variable is 1 if the user became Silver tier during the S period as shown in FIG. 2 and is 0 if the user did not. To generate training examples, samples from past years are used. This set of vectors and their respective associated target variables constitutes a training set. Table VI shows an example of passenger vectors form Table V with the corresponding target variable.

TABLE VI

Example of feature vectors and target variables

| Passenger Id | Feature vector | Target variable |
|---|---|---|
| 1 | (43, 13.54, . . . , 0, 0, 12, 0, . . . , 0, 1, 1, 0, 0, 0, . . . , 0, 0, 0) | 0 (The passenger did not achieve silver status during S period) |
| 2 | (26, 2.9, . . . , 0, 0, 12, 0, . . . , 0, 1, 1, 0, 0, 0, . . . , 0, 0, 0) | 1 (yes he did) |
| ... | ... | ... |

These vectors can be considered as a matrix, where rows are passengers, columns are features, and the last column is the target variable. Such a matrix can be used to train a mathematical model with the purpose of predicting the likelihood that a passenger will become a silver tier member in a given time frame. Once the model is trained, to predict if a passenger will attain silver status in a given time frame S in the future, one only needs to generate its feature vector by observing the passenger for a period of time D since his/her first flight. Once the vector is generated as explained above (without target variable), the vector can be input into the trained mathematical model and the model will output a result, which indicates how likely they are to become a silver tier member during period S.

Mathematical MODELs

In the embodiment of the present invention, GBM (Generalized Boosting Machine package) and GLM (generalized liner model) are used.

GBM

GBM implemented in R language is an exemplary implementation of boosting, which is a machine learning meta-algorithm.

In computer science and mathematical optimization, a meta-algorithm is a higher-level procedure or heuristic designed to find, generate, or select a lower-level procedure or heuristic (partial search algorithm) that may provide a sufficiently good solution to an optimization problem, especially with incomplete or imperfect information or limited computation capacity. Meta-algorithm may make few assumptions about the optimization problem being solved, and so they may be usable for a variety of problems.

Boosting can be seen as minimization of a convex loss function over a convex set of functions. Specifically, the loss being minimized is the exponential loss $$\sum_i e^{-y_i f(x_i)}$$

and we are seeking a function $$f(x) = \sum_t \alpha_t h_t(x)$$

GBM package implements extensions to Freund and Schapire's AdaBoost (short for Adaptive Boosting). Freund and Schapire's AdaBoost algorithm is set forth in more detail in Appendix-2, and Friedman's gradient boosting machine is set forth in more detail in Appendix-3.

In this embodiment, the aforementioned (passenger) training matrix can be used to train the GBM model using the R Language. Other programming languages may also be used. GBM has various parameters that can affect the performance of the model. For example, the number of trees (size) is one of them and usually the most important. The optimal number of trees was found by trial and error using cross validation technique in which a part of the training set is used to train a model and the other part is used to test how much error there is in the prediction. The other parameters of GBM model were interaction.depth=5 and bag.fraction=0.5. The training matrix is used to train the GBM model.

To make a new prediction for one or more passengers, the passengers' vectors are input into the model and the model will return a number from 0 to 1 for each vector. 0 means the model predicts 0% chance for that passenger to attain silver tier status within the S period of time. 1 means that the model is 100% confident that the passenger will attain silver status within the S period or before.

Appendix 5 shows example pseudocode for the GBM algorithm. This pseudocode allows those skilled in the art to implement the GBM in the R language or another software programming language.

GLM

The other algorithm used is GLM. GLM stands for General Linear Model. In this embodiment, its implementation in R Language is used. GLM is just a simple logistic regression where optimize the Root mean squared error (RMSE), where Error=silver_attain−prediction, i.e. the difference of an actual result and result predicted by the model. GLM is faster to train than GBM.

Blending with Grid Search

In order to increase prediction power the output of the aforementioned mathematical models are blended as follows: the final prediction was constructed as a linear combination of the output of the two. Trial and error may be used to find the optimal proportion of linear combination on the training set. In this embodiment, it has been found that the optimal combination is 80% of the GBM prediction plus 20% of the GLM prediction.

Loss Function

In this embodiment, Precision and Accuracy are defined in the following way:

$$P = \frac{N_0}{N_0 + N_1} \quad (1)$$

$$A = \frac{N_0}{N_0 + N_2}$$

where P is precision, A is accuracy, $N_0$ is a number of true positives or users predicted to become silver and that later indeed became silver, $N_1$ is the number of false positives or users predicted to become silver but who did not indeed become silver after S days and $N_2$ is the number of false negatives or number of users predicted to not become silver and who indeed became silver.

Comparison of Performances

Table VII and VIII compare key performance indicators of predictive power between the traditional model (monthly extrapolation) and the D/S model. The columns P and A of Table VII were calculated according to Equation (1). Table VIII shows actual numbers on one particular example for D/S=3/3 months respectively. These parameters can be adjusted to suit various forecasting needs.

TABLE VII

Comparison of prediction power of Extrapolation vs. D/S Model
Question asked D months after 1st flight:
Will they become Silver within S months?

| Case | D | S | Extrapolation of miles Rx[1] | D/S Model Rx[2] | P[3] | A[4] |
|---|---|---|---|---|---|---|
| 0 | 0.5 | 3 | 0.39 | 0.60 | 81% | 31% |
| 1 | 1 | 1 | 0.39 | 0.71 | 87% | 53% |
| 2 | 1 | 2 | 0.39 | 0.70 | 89% | 48% |
| 3 | 3 | 1 | 0.50 | 0.89 | 97% | 82%[5] |
| 4 | 3 | 3 | 0.39 | 0.67 | 95% | 46% |
| 5 | 6 | 3 | 0.51 | 0.83 | 96% | 69% |

Notes.
[1]To compare predictive power between two models we use correlation as a proxy.
Rx = correlation of accumulated miles with binary target variable silver_attain.
[2]correlation of the Model's prediction with binary target variable silver_attain.
[3]P = Precision, i.e. of all users who were predicted to become Silver, how many did indeed become silver?
[4]A = Accuracy: Of all users who will become silver how many has not been missed?
[5]See Table 3 for details on case 3.

TABLE VIII

Precision and Accuracy of Silver Attainment. Prediction of a 3/1 model

| Predicted (With 3 months of data[1]) | What really happened | Is the prediction correct? | Stats Numbers by case | Percent of total |
|---|---|---|---|---|
| No | No | Yes | 54752 | 97.09 |
| Yes | Yes | Yes | 1309 | 2.32 |
| No | Yes | No | 293 | 0.52 |
| Yes | No | No | 37 | 0.07 |
| | | Total | 56391 | 100 |

Notes:
Prediction performed for each passenger with 3 month of data since 1st flight at time point: end of the three months.
False Positive = 2.75%.
Accuracy or Discovery Rate = 81.71%.

Figure 1:
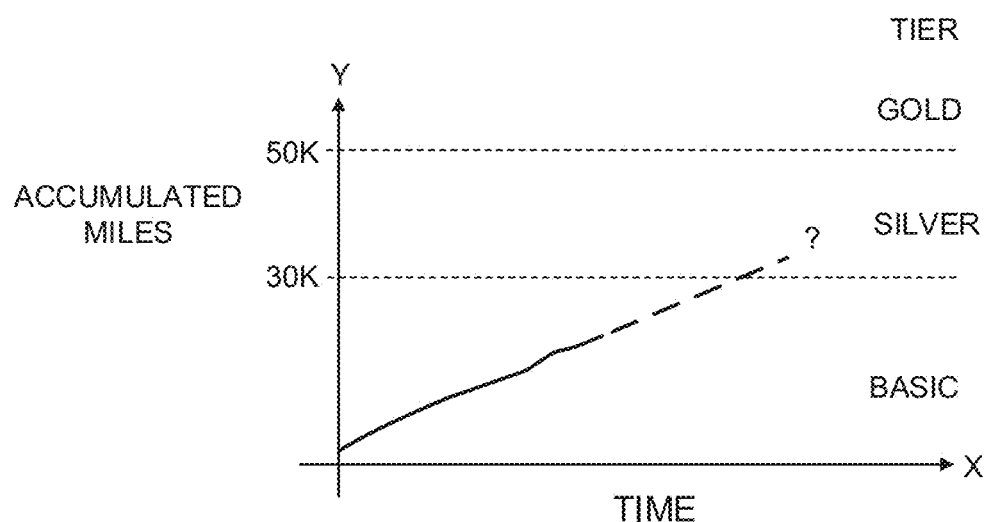
FIG. 1 shows how linear extrapolation is used to predict when and/or if a customer will become high-value customer.

FIG. 1 illustrates correlation of Silver attainment with Extrapolation Method vs. correlation of silver attainment with D/S model for five different D/S cases as defined in Table 2.

Confirmation by Forward Testing

On Feb. 28, 2013, this model has been used to predict what existing customers would do in two weeks in the future and in three months in the future respectively. In particular, the following two questions have been investigated:
1) what customers that had enrolled during December 2012 would attain silver in the first quarter of 2013? This is a D=1/S=3 model and
2) what customers that had enrolled during December 2012 would attain silver in the two first weeks of 2013? This is a D=1/S=0.5 model.

The training data used relates to data obtained from mid 2006 to December 2012. The D=1/S=3 model is trained. The results of predictions of passengers becoming silver tier members are ordered by confidence form high to low, and the top 200 are used to compare with the passengers' real activities. The results have been calculated by mid March 23$^{rd}$. On Jun. 9, 2013, when passengers' real activities are obtained from the airline, the accuracy of the model was calculated to be 100% with no false positives. Additionally, the prediction was also obtained for a D=0.5/S=1 model. This model also reached 100% accuracy. In this case, the top 600 passengers ordered by confidence are used to compare with passengers' real activities.

Application on Real Time Resource Allocation

This invention can help to create value for airline operators. Let's consider a flight from ADX to TYO. There are only five available seats in business class. Let's assume that these five seats can be used to upgrade five passengers in the economy class. Of the 150 passengers expected to board the flight, let's assume that 20 are eligible for upgrade. The model will take less than one second to rank the 20 passengers by probability of becoming Silver tier members in near future. FIG. 4 shows an example of the results. With this ranking at hand, we can now rationally allocate the five upgrades to the five customers most likely to become Silver rather than to customers with a zero probability of becoming Silver.

It is estimated that with further tuning the accuracy of the model can be increased by 5% to 30% from current levels, and by a further 3% to 10% if publicly available Social Media data was to be coalesced into the model. The information from Social Media data can be transformed to new features which can be feed to the mathematical model. In majority of cases adding new features increases the accuracy of constructed model.

It has been shown that it is possible for the method outlined above to outperform simple extrapolation models in predicting the likelihood of passengers becoming privileged tier members in airlines. False positive rates can be less than 3%. The causes of a false positive may be due to one or more of the following: (1) the predictive nature of the data is not unlimited. (2) The predictive power of the model can be improved. (3) The customer did not attain the Silver status due to causes beyond the control of the airline. (for example: passenger death, change of work location) (4) The customer did not become a high-value customer because poor resource allocation (for example, a passenger joined a competing frequent flier program because it offered better perks). The above methods can be implemented by software, hardware and/or firmware. They may be implemented by software run on a general purpose computer, including at least one processor and one memory. They may also be implemented in a distributed manner on a plurality of computing devices in a cloud computing network. It may also be wholly to partially implemented using hardware, such as one or more ASICs or one or more FPGAs.

The present invention is not to be limited in scope by the specific aspects and embodiments described herein. Indeed, various modifications of the invention in addition to those described herein will become apparent to those skilled in the art from the foregoing description and accompanying figures. Such modifications are intended to fall within the scope of the appended claims. Moreover, all aspects and embodiments described herein are considered to be broadly applicable and combinable with any and all other consistent aspects and embodiments, as appropriate.

APPENDIX-1

K-Means Algorithm

Given an initial set of k means $m_1^{(1)}, \ldots, m_k^{(1)}$ (see below), the algorithm proceeds by alternating between two steps:

Assignment step: Assign each observation to the cluster whose mean yields the least within-cluster sum of squares (WCSS). Since the sum of squares is the squared Euclidean distance, this is intuitively the "nearest" mean. (Mathematically, this means partitioning the observations according to the Voronoi diagram generated by the means).

$$S_i^{(t)} = \{x_p : \|x_p - m_i^{(t)}\|^2 \leq \|x_p - m_j^{(t)}\|^2 \forall 1 \leq j \leq k\},$$

where each $x_p$ is assigned to exactly one $S^{(t)}$, even if it could be is assigned to two or more of them.

Update step: Calculate the new means to be the centroids of the observations in the new clusters.

$$m_i^{(t+1)} = \frac{1}{|S_i^{(t)}|} \sum_{x_j \in S_i^{(t)}} x_j$$

Since the arithmetic mean is a least-squares estimator, this also minimizes the within-cluster sum of squares (WCSS) objective.

The algorithm has converged when the assignments no longer change. Since both steps optimize the WCSS objective, and there only exists a finite number of such partitionings, the algorithm must converge to a (local) optimum. There is no guarantee that the global optimum is found using this algorithm.

APPENDIX-2

Ada Boost Algorithm for the Binary Classification Task

Given:
training set: $(x_1, y_1), \ldots, (x_m, y_m)$ where $x_i \in X$, $y_i \in Y = \{-1, +1\}$
number of iterations
For i=1, . . . , m:
Initialize $$D_1(i) = \frac{1}{m},$$

For t=1, . . . , T:
From the family of weak classifiers $\mathcal{H}$, find the classifier $h_t$ that maximizes the absolute value of the difference of the corresponding weighted error rate $\epsilon_t$ and 0.5 with respect to the distribution $D_t$:

$$h_t = \underset{h_t \in \mathcal{H}}{\operatorname{argmax}} |0.5 - \epsilon_t|$$

where $$\epsilon_t = \sum_{i=1}^{m} D_t(i) I(y_i \neq h_t(x_i)).$$

(I is the indicator function)
If $|0.5 - \epsilon_t| \leq \beta$, where $\beta$ is a previously chosen threshold, then stop.

Choose $\alpha_t \in \mathbb{R}$, typically $$\alpha_t = \frac{1}{2}\ln\frac{1-\epsilon_t}{\epsilon_t}.$$

For i=1, ..., m:
Update $$D_{t+1}(i) = \frac{D_t(i)\exp(\alpha_t(2I(y_i \neq h_t(x_i)) - 1))}{Denom},$$

where the denominator, Denom, is the normalization factor ensuring that $D_{t+1}$ will be a probability distribution.

Output the Final Classifier:

$$H(x) = \text{sign}\left(\sum_{t=1}^{T}\alpha_t h_t(x)\right)$$

Thus, after selecting an optimal classifier $h_t$ for the distribution $D_t$, the examples $x_i$ that the classifier $h_t$ identified correctly are weighted less and those that it identified incorrectly are weighted more. Therefore, when the algorithm is testing the classifiers on the distribution $D_{t+1}$, it will select a classifier that better identifies those examples that the previous classifier missed.

APPENDIX-3

Gradient Boosting Algorithm

In many supervised learning problems one has an output variable y and a vector of input variables x connected together via a joint probability distribution P(x, y). Using a training set $(x_1, y_1), \ldots, (x_n, y_n)$ of known values of x and corresponding values of y, the goal is to find an approximation $\hat{F}(x)$ to a function $F^*(x)$ that minimizes the expected value of some specified loss function L(y, F(x)):

$$F^* = \underset{F}{\text{argmin}} E_{x,y}L(y, F(x)).$$

Gradient boosting method assumes a real-valued y and seeks an approximation $\hat{F}(x)$ in the form of a weighted sum of functions $h_i(x)$ from some class $\mathcal{H}$, called base (or weak) learners:

$$F(x) = \sum_{i=1}^{M}\gamma_i h_i(x) + \text{const.}$$

In accordance with the empirical risk minimization principle, the method tries to find an approximation $\hat{F}(x)$ that minimizes the average value of the loss function on the training set. It does so by starting with a model, consisting of a constant function $F_0(x)$, and incrementally expanding it in a greedy fashion:

$$F_0(x) = \underset{\gamma}{\text{argmin}}\sum_{i=1}^{n}L(y_i, \gamma),$$

$$F_m(x) = F_{m-1}(x) + \underset{f\in\mathcal{H}}{\text{argmin}}\sum_{i=1}^{n}L(y_i, F_{m-1}(x_i) + f(x_i)),$$

where f is restricted to be a function from the class $\mathbb{R}$ of base learner functions. However, the problem of choosing at each step the best f for an arbitrary loss function L is a hard optimization problem in general, and so we'll "cheat" by solving a much easier problem instead.

The idea is to apply a steepest descent step to this minimization problem. If we only cared about predictions at the points of the training set, and f were unrestricted, we'd update the model per the following equation, where we view L(y, f) not as a functional of f, but as a function of a vector of values $f(x_1), \ldots, f(x_n)$:

$$F_m(x) = F_{m-1}(x) - \gamma_m\sum_{i=1}^{n}\nabla_f L(y_i, F_{m-1}(x_i)),$$

$$\gamma_m = \underset{\gamma}{\text{argmin}}\sum_{i=1}^{n}L\left(y_i, F_{m-1}(x_i) - \gamma\frac{\partial L(y_i, F_{m-1}(x_i))}{\partial f(x_i)}\right).$$

But as f must come from a restricted class of functions (that's what allows us to generalize), we'll just choose the one that most closely approximates the gradient of L. Having chosen f, the multiplier γ is then selected using line search just as shown in the second equation above.

In pseudocode, the generic gradient boosting method is:
Input: training set $\{(x_i, y_i)\}_{i=1}^{n}$, a differentiable loss function L(y, F(x)), number of iterations M.
Algorithm:
1. Initialize model with a constant value:

$$F_0(x) = \underset{\gamma}{\text{argmin}}\sum_{i=1}^{n}L(y_i, \gamma).$$

2. For m=1 to M:
1. Compute so-called pseudo-residuals:

$$r_{im} = -\left[\frac{\partial L(y_i, F(x_i))}{\partial F(x_i)}\right]_{F(x)=F_{m-1}(x)} \text{ for } i = 1, \ldots, n.$$

2. Fit a base learner $h_m(x)$ to pseudo-residuals, i.e. train it using the training set $\{(x_i, r_{im})\}_{i=1}^{n}$.
3. Compute multiplier $\gamma_m$ by solving the following one-dimensional optimization problem:

$$\gamma_m = \underset{\gamma}{\text{argmin}}\sum_{i=1}^{n}L(y_i, F_{m-1}(x_i) + \gamma h_m(x_i)).$$

4. Update the model:

$$F_m(x) = F_{m-1}(x) + \gamma_m h_m(x).$$

3. Output $F_M(x)$.

APPENDIX-4

General Linear Model

The general linear model (GLM) is a statistical linear model. It may be written as $$Y = XB + U,$$

where Y is a matrix with series of multivariate measurements, X is a matrix that might be a design matrix, B is a matrix containing parameters that are usually to be estimated and U is a matrix containing errors or noise. The errors are usually assumed to follow a multivariate normal distribution. If the errors do not follow a multivariate normal distribution, generalized linear models may be used to relax assumptions about Y and U.

APPENDIX 5

Pseudocode for the Generalized Boosting Machine (GBM) package algorithm

```
[ ] = box
{ } = loop
--> = arrow
0. define a model
[ Chose a D, and a S ]
1. Cleaning
[ data files in txt format such as csv] --> [ remove of broken lines and non alphanumeric characters] --> [remove lines that have a different number of columns than supposed to] --> [save each new clean line to a new file]
2. Remove Outliers
[remove passengers that fly less than 1 return trip in 6 years] --> [remove passenger that fly more than 500 times]
3. Building features
[Assign a number to each unique country in data file starting by 0]
[Assign a number to each unique city in data file starting by 0]
[Assign a number to each unique airport in data file starting by 0]
[Assign a number to each unique employer in data file starting by 0]
[Assign a number to each unique ticket class code starting by 0]
[ Create an empty matrix P ] -->
[ Define a period of time D with a start and an end where:
    start = the date of the first flight of the passenger with he airline
    end = start + D days
] -->
[ for each unique passenger (by passenger id){
    [append id to a vector called unique_ids] -->
    [append a 1 to target vector if user became upgraded from basic membership to higher membership tier before end + S days time limit, otherwise append 0 to target vector] -->
    [create empty vector v] -->
    [append the passenger age to v] -->
    [append the sum of miles earned from start to end, to v] -->
    [append the average miles per flight earned from start to end, to v] -->
    [append data collected in surveys such as interest/hobby to v] -->
    [N = number previously assigned to the country which matches the passport of the passenger]
    [append N zeros to v]
    [append one 1 to v]
    [M = total number of unique countries that have been assigned a number]
    [append M-N -1 zeroes to v]
    [N = number assigned to the city which matches the passport of the passenger]
    [append N zeros to v]
    [append one 1 to v]
    [M = total number of unique cities assigned a number]
    [append M-N -1 zeroes to v]
    [N = number assigned to the Employer of the passenger]
    [append N zeros to v]
    [append one 1 to v]
    [M = total number of unique Employers assigned a number]
    [append M-N -1 zeroes to v]
    [for each airport departed by the passenger:
        [N = number assigned to Airport of origin/arrival for a given passenger flight]
        [append N zeros to v]
        [append one 1 to v]
        [M = total number of unique airports (airport codes)]
        [append M-N -1 zeroes to v]
    ]
    [for each airport arrived by the passenger:
        [N = number assigned to Airport of origin/arrival for a given passenger flight]
        [append N zeros to v]
        [append one 1 to v]
        [M = total number of unique airports (airport codes)]
        [append M-N -1 zeroes to v]
    ]
    [for each ticket class code (A,B,Z, Economy, Business, Frist...) used by passenger:
```

APPENDIX 5-continued

Pseudocode for the Generalized Boosting Machine (GBM) package algorithm

```
        [N = number assigned to the ticket codes that matches a given passenger ticket]
        [append N zeros to v]
        [append one 1 to v]
        [M = total number of unique ticket codes]
        [append M-N -1 zeroes to v]
    ]
    [add v as a new row to P]
}
] // end for
[make an empty matrix called KL]
[for j = { 2, 3, 5, 7, 10, 20 } {
    [make an empty matrix called K_labels]
    [ use K-means with K=j to cluster each row contained in P]
    [Assign a index number to each cluster label starting from 0, (0,1 .. ) ]
    [ for each row in P:{
        [make v and empty vector]
        [CLi = index of cluster assgined to this row]
        [append CLi zeros to v]
        [append one 1 to v]
        [append K-Cli-1 zeroes to v]
        [add v as a new row to K_labels]
    }
    ]
    [append K_labels to the right side of KL]
}
] // K
[Append KL to the right side of P]
4. GBM
[make a target vector t w]
[ Train a GBM model with input P and parameters
    1) distribution = "bernoulli",
    2) n.trees =2000,
    3) shrinkage = 0.01,
    4) interaction.depth = 0.5,
    5) bag.fraction = 0.5,
    6) train.fraction =0.1,
    7) n.minobsinnode=10.
    8) Target vector= target
]
[Train a logistic regression with input P and parameter target = target vector]
Usage example:
[get data for a given set of passengers that have joined the airline D days ago
and whose behavior wants to be predicted]
[convert the data to a "P" matrix form as described before]
[output = 0.9 * GBM(P2) + 0.1GLM(P2)]
now output is a vector that contains for each passenger a number/rank that indicates the confidence of the model that a given passenger will upgrade tier
within S days from now.
```

The invention claimed is:

1. A method comprising:
   providing training data for training at least one mathematical model, wherein the training data is based on past flight information of a plurality of passengers, and the training data comprises a first set of vectors and an associated target variable for each passenger in the plurality of passengers;
   training the at least one mathematical model with the training data; and
   providing a second set of vectors relating to past flight information of a passenger as inputs to the trained at least one mathematical model and calculating an output of the trained at least one mathematical model based on the inputs, wherein the output represents a prediction of future flight activities of the passenger,
   wherein the at least one mathematical model comprises a first mathematical model and a second mathematical model, and wherein said calculating an output of the trained at least one mathematical model comprises calculating an output of the trained first mathematical model based on the inputs, calculating an output of the trained second mathematical model based on the inputs and calculating a final output based on the outputs of the first and the second mathematical models.

2. The method of claim 1, wherein said calculating the final output based on the outputs of the first and the second mathematical models comprises calculating the final output as a linear combination of the outputs of the first and the second mathematical models.

3. The method of claim 2, wherein the linear combination is substantially 80% of the output of the first mathematical model and substantially 20% of the output of the second mathematical model.

4. The method of claim 1, wherein the training data comprises cluster features for associating the passengers with their respective clusters, wherein said cluster features are obtained by k-means algorithms for classifying the plurality of passengers into a plurality of clusters.

5. The method of claim 1, wherein the output representing a prediction of future flight activities of the passenger is used for determining resource allocation to the passenger.

6. A system comprising at least one processor and at least one memory configured to:
provide training data for training at least one mathematical model, wherein the training data is based on past flight information of a plurality of passengers, and the training data comprises a first set of vectors and an associated target variable for each passenger in the plurality of passengers;
train at least one mathematical model with the training data; and
provide a second set of vectors relating to past flight information of the passenger as inputs to the trained at least one mathematical model and to calculate an output of the trained at least one mathematical model based on the inputs, wherein the output represents a prediction of future flight activities of the passenger,
wherein the at least one mathematical model comprises a first mathematical model and a second mathematical model, and
wherein the system is configured to calculate an output of the trained first mathematical model based on the inputs, calculating an output of the trained second mathematical model based on the inputs and calculating a final output based on the outputs of the first and the second mathematical models.

7. The system of claim 6, wherein the system is configured to calculate the final output as a linear combination of the outputs of the first and the second mathematical models.

8. The system of claim 6, wherein the training data comprises cluster features for associating the passengers with their respective clusters, wherein said cluster features are obtained by k-means algorithms for classifying the plurality of passengers into a plurality of clusters.

* * * * *